(12) United States Patent
Chana et al.

(10) Patent No.: US 10,302,428 B2
(45) Date of Patent: May 28, 2019

(54) FLUID DRIVEN POSITION SENSOR

(71) Applicant: OXFORD UNIVERSITY INNOVATION LIMITED, Botley, Oxford (GB)

(72) Inventors: Kamaljit Singh Chana, Oxford (GB); Jonathan Shamus Sullivan, Fleet (GB)

(73) Assignee: OXFORD UNIVERSITY INNOVATION LIMITED, Botley, Oxford (GB)

( * ) Notice: Subject to any disclaimer, the term of this patent is extended or adjusted under 35 U.S.C. 154(b) by 311 days.

(21) Appl. No.: 15/121,536

(22) PCT Filed: Feb. 18, 2015

(86) PCT No.: PCT/GB2015/050462
§ 371 (c)(1),
(2) Date: Aug. 25, 2016

(87) PCT Pub. No.: WO2015/128614
PCT Pub. Date: Sep. 3, 2015

(65) Prior Publication Data
US 2016/0363441 A1    Dec. 15, 2016

(30) Foreign Application Priority Data
Feb. 28, 2014 (GB) .................................. 1403594.3

(51) Int. Cl.
*G01B 13/12* (2006.01)
*B29C 37/00* (2006.01)
*F15B 15/28* (2006.01)
*G01B 13/03* (2006.01)

(52) U.S. Cl.
CPC .............. *G01B 13/12* (2013.01); *B29C 37/00* (2013.01); *F15B 15/2838* (2013.01); *G01B 13/03* (2013.01); *B29C 2037/90* (2013.01)

(58) Field of Classification Search
CPC ..... G01B 13/12; G01B 13/03; F15B 15/2838; B29C 2037/90; B29C 37/00
See application file for complete search history.

(56) References Cited

U.S. PATENT DOCUMENTS

| 3,517,545 A | 6/1970 | Ogren |
| 4,325,249 A | 4/1982 | Berglund |
| 5,163,312 A | 11/1992 | Ayers |

(Continued)

FOREIGN PATENT DOCUMENTS

| EP | 2357444 A1 | 8/2011 |
| FR | 2276564 A1 | 1/1976 |

(Continued)

*Primary Examiner* — Daniel S Larkin
(74) *Attorney, Agent, or Firm* — Harness, Dickey & Pierce, P.L.C.

(57) ABSTRACT

Methods and apparatus for measuring the position of an object relative to a reference are disclosed. In an arrangement, a pressurized fluid is used to drive rotation of a cylinder around a piston and to bias the cylinder longitudinally. Ducts are provided in the cylinder and arranged so at to provide pulses of the fluid out of the cylinder through a reading port, the pulses being such as to uniquely identify the position of the cylinder relative to the piston and thereby of the object relative to the reference.

27 Claims, 12 Drawing Sheets

(56) References Cited

U.S. PATENT DOCUMENTS

| | | | |
|---|---|---|---|
| 5,213,726 A | | 5/1993 | Ramsey et al. |
| 5,224,374 A | | 7/1993 | Ayers |
| 5,244,372 A | | 9/1993 | Ramsey et al. |
| 5,298,073 A | * | 3/1994 | Wilson ................ C03C 17/002 118/712 |
| 5,386,716 A | | 2/1995 | Thurston et al. |

FOREIGN PATENT DOCUMENTS

| | | |
|---|---|---|
| GB | 1428887 A | 3/1976 |
| JP | H04-331305 A | 11/1992 |
| JP | 2002107133 A | 4/2002 |
| JP | 2008151261 A | 7/2008 |
| SU | 933380 A1 | 6/1982 |

* cited by examiner

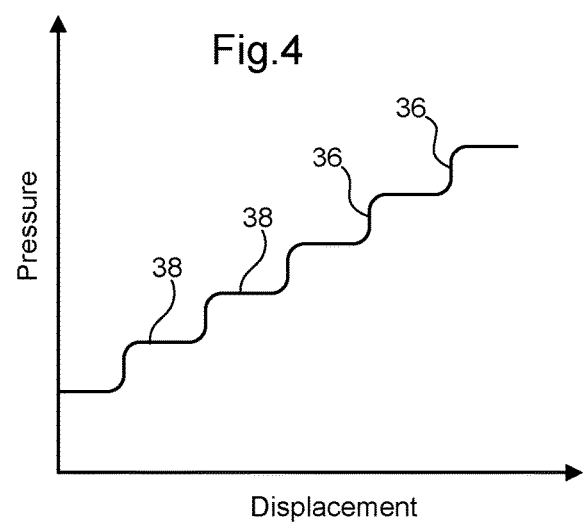
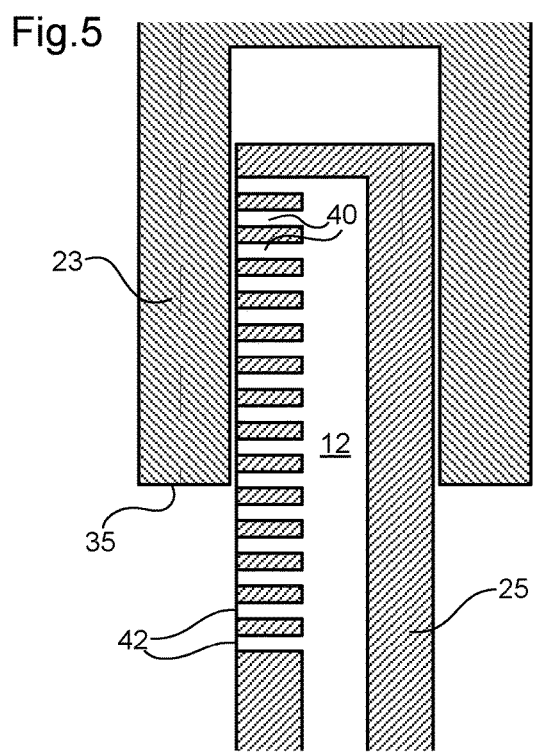
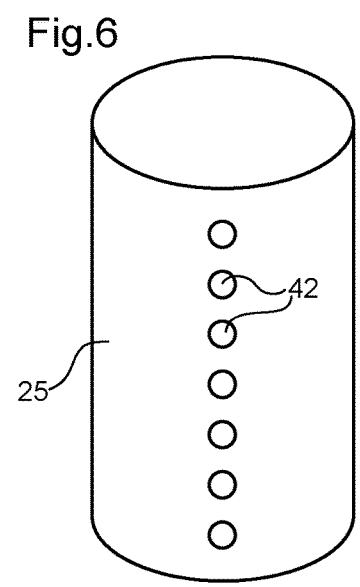

Angular position around piston (degrees)

FLUID DRIVEN POSITION SENSOR

CROSS REFERENCE TO RELATED APPLICATIONS

This application is a U.S. National Phase Application under 35 U.S.C. 371 of International Application No. PCT/GB2015/050462 filed on Feb. 18, 2015 and published as WO 2015/128614 A1 on Sep. 3, 2015. This application claims priority to British Application No. 1403594.3 filed on Feb. 28, 2014. The entire disclosures of the above applications are incorporated herein by reference.

The present invention relates to measuring position (or displacement) of an object, particularly in high temperature environments. The invention is particularly applicable to measuring the separation between opposing surfaces of mould tool parts for use in a high temperature manufacturing process.

In various machines and industrial processes it is necessary to know the displacement of one part relative to another part. Various methods and apparatus are available for carrying out such measurements, including eddy current sensors, capacitive sensors, optical interferometers and electrical interference devices. However, such methods and apparatus require electrical and/or optical access to the parts being measured, which may be inconvenient in hostile conditions, for example where the parts are at high temperature or where levels of radioactivity are high. Furthermore, high temperatures and/or radiation levels may limit the lifetime and/or compromise the accuracy of the sensing apparatus.

It is an object of the present invention to provide a new type of sensor and method of sensing that at least partially overcome one or more of the problems with the prior art discussed above.

According to an aspect of the invention, there is provided a sensor for measuring the position of an object relative to a reference, comprising: a reference component and a displacement component, the displacement component being moveable linearly, rotatably, or both, relative to the reference component; and an input port for receiving a pressurized fluid, wherein: the reference and displacement components are configured such that a fluidic flow resistance through a predetermined flow path varies in a predetermined way as a function of a linear position, an angular position, or both, of the reference component relative to the displacement component; the reference and displacement components are configured such that the object can engage with the sensor in such a way that a linear displacement, an angular displacement, or both, of the object relative to the reference causes a corresponding linear displacement, angular displacement, or both, between the reference and displacement components; the sensor further comprises a detector adapted to obtain a measure of the flow resistance or of a change in the flow resistance and thereby measure a linear position, an angular position, or both, of the object relative to the reference; and the reference and displacement components are configured to allow detection of at least three different flow resistances associated respectively with at least three different linear positions, at least three different angular positions, or a combination of at least three different linear and angular positions, of the object relative to the reference.

Thus, a sensor is provided that does not require any electrical circuitry or other complex or delicate components to be placed in the region where the position of the object is being measured. Furthermore, no electrical or other delicate connections need to be run from this region to an outside, ambient environment. The sensor can therefore be used for measuring position in a wide range of environments, including very high temperature environments or environments having high levels of radioactivity. The harsh conditions in such environments will have less impact on the sensor than would be the case with known sensors. Technical difficulties associated with making electrical or other delicate connections between the ambient environment and the environment of the sensor are avoided.

In an embodiment, the reference component comprises a cylinder and the displacement component comprises a piston configured to move linearly and/or rotate within the cylinder. In this embodiment the sensor may be configured such that the flow resistance depends predominantly on the flow resistance encountered by the pressurized fluid passing through a region of closest approach between an outer surface of the piston and an inner surface of the cylinder; and the length of the region varies as a function of the relative linear positions of the reference and displacement components. This arrangement is mechanically simple and robust, facilitating efficient manufacture and reliability.

In an embodiment, the sensor comprises a fluid source for supplying the pressurized fluid to the input port, and the fluid source is configured to provide the pressurized fluid with a pulsatile pressure variation at the input port. Optionally the pressure variation is periodic, optionally sinusoidal, squarewave, or a combination of the two (e.g. a smoothed squarewave). In an embodiment the detector is configured to measure the linear position based on a differential measurement using the flow resistance or the change in the flow resistance measured at two different pressures in the pressurized fluid at the input port. The inventors have found that a differential measurements of this type reduces or eliminates the influence of temperature on the measurement of linear position. Temperature may otherwise have a large effect due to the dependence on temperature of relevant properties of the fluid such as density and viscosity. A simple and robust measurement of the linear position is thereby made possible without the need to provide look-up tables and temperature sensors, or the like, to calibrate for the effects of temperature. Furthermore, the pulsatile pressure variation reduces the risk of sticking between the reference component and the displacement component.

In an embodiment, the reference component comprises a cylinder and the displacement component comprises a piston configured to move linearly within the cylinder. In such an embodiment, the piston comprises: a first internal lumen into which the pressurized fluid is channelled so as to flow from a proximal end towards a distal end of the piston and to leave the piston at the distal end; and a second internal lumen, separate from the first internal lumen, wherein: the detector is configured to measure a pressure in a volume adjacent to the distal end of the piston, via the second internal lumen, in order to obtain the measure of the flow resistance or of the change in the flow resistance. The inventors have found that using the pressure in the volume adjacent to the distal end of the piston, measured in this way, provides particularly high levels of accuracy and reproducibility in the measurement of the flow resistance or change in the flow resistance.

In an embodiment, the sensor comprises a channelling system adapted to channel the pressurized fluid in such a way as to cause the cylinder to rotate continuously. In another embodiment, the sensor comprises a channelling system adapted to channel the pressurized fluid in such a way as to cause the piston to rotate continuously. Rotating the cylinder or piston continuously increases reliability by decreasing the likelihood of the piston sticking relative to the cylinder. The rotation provides gyroscopic stability, helping to centre the piston relative to the cylinder. The relative movement at the interface between the piston and cylinder, caused by the rotation, will tend to reduce oxidation or deposition/contamination developing at the interface. This effect may be particularly important in high temperature environments, where oxidation may happen quickly and/or in environments where contamination/dust levels are very high.

In an embodiment, a plurality of piston ducts or cylinder ducts are provided at different longitudinal positions in the piston or cylinder and the detector is configured to sense when one of the piston or cylinder ducts is aligned with a reading port in the reference component. In such an embodiment, the size of the reading port and the longitudinal separation or separations of the piston or cylinder ducts is/are such that for at least a portion of a longitudinal range of motion of the cylinder relative to the piston the reading port overlaps with at least two different piston or cylinder ducts during at least a portion of one complete rotation of the piston or cylinder. In such an embodiment, the time difference or differences between different ones of the pulses corresponding to the at least two different piston or cylinder ducts is/are characteristic of the longitudinal position of the piston relative to the cylinder. In this way, the position of the object can be determined uniquely based on the time difference or differences between pulses. Comparing the time difference between pulses with the time period for a complete rotation makes it possible to determine a phase difference between the pulses that is characteristic of the position of the object independently of the speed of rotation of the piston or cylinder. Using rotation of the piston or cylinder to generate periodic pulses provides a positive indication that the sensor is operating correctly. If the piston sticks in the cylinder, rotation will stop and no pulses (or a continuous "pulse") will be output. The generation of periodic pulses confirms that the piston is moving freely relative to the cylinder.

In an aspect, there is provided a pair of mould tool parts for constraining an article during a moulding process. The moulding process may involve moulding of a metallic article. The moulding process may take place at high temperature, for example above 900 degrees Celsius (optionally above 950 degrees Celsius, optionally above 1000 degrees Celsius). Such temperatures would not be tolerated by most prior art position sensors. The moulding process may involve inflating a metallic component between the mould tool parts at the high temperatures.

In an aspect, there is provided a positioning apparatus comprising: an object to be positioned; an actuator configured to adjust the position of the object; a sensor according to an embodiment configured to measure the position of the object relative to a reference; and a controller configured to control the actuator in response to an output from the sensor.

In an aspect, there is provided an actuator comprising: a sensor according to an embodiment configured to generate a force to bias the reference component relative to the displacement component, the force being adapted to displace an object as part of an actuation process and to measure the displacement of the object caused by the actuation.

In an aspect, there is provided a method of measuring the position of an object relative to a reference, comprising: providing a reference component and a displacement component, the displacement component being moveable linearly, rotatably, or both, relative to the reference component; and providing an input port for receiving a pressurized fluid, wherein: the reference and displacement components are configured such that a fluidic flow resistance through a predetermined flow path varies in a predetermined way as a function of a linear position, an angular position, or both, of the reference component relative to the displacement component; the method further comprises arranging the object so that it engages with the sensor in such a way that a linear displacement, an angular displacement, or both, of the object relative to the reference causes a corresponding linear displacement, angular displacement, or both, between the reference and displacement components; the method further comprises using a detector to obtain a measure of the flow resistance or of a change in the flow resistance and thereby measure a linear position, an angular position, or both, of the object relative to the reference; and the reference and displacement components are configured to allow detection of at least three different flow resistances associated respectively with at least three different linear positions, at least three different angular positions, or a combination of at least three different linear and angular positions, of the object relative to the reference.

Embodiments of the invention will now be described, by way of example only, with reference to the accompanying drawings in which corresponding reference symbols indicate corresponding parts, and in which:

FIG. 4 depicts a variation of applied pressure with relative displacement of the piston and cylinder of FIG. 1;

FIG. 5 is a schematic side sectional view of a sensor having a piston with a plurality of piston ducts;

FIG. 6 is a perspective view of the piston of FIG. 5;

In any of the embodiments described herein, references to measurements of flow resistance or changes of flow resistance should be understood to encompass the obtaining of any quantity which is dependent on the flow resistance or change of flow resistance, including for example the obtaining of a flow rate or of a pressure which is dependent on the flow resistance.

Figure 1:
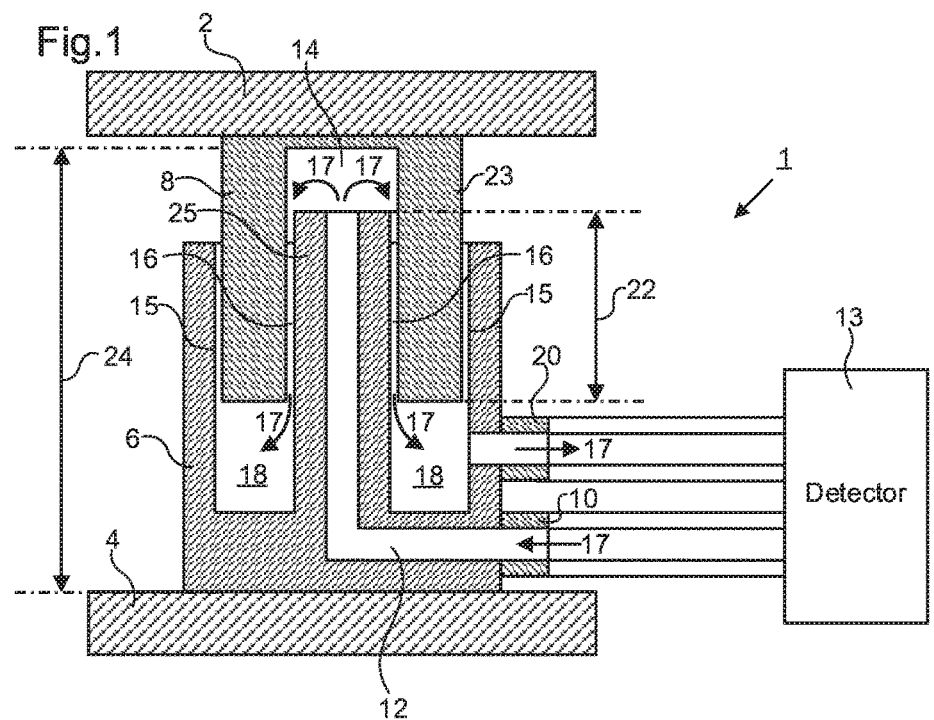
FIG. 1 is a schematic side sectional view of a sensor comprising a piston and a cylinder.

In an embodiment there is provided a sensor 1 for measuring a linear and/or angular position of an object. In certain embodiments the sensor 1 is configured to measure a linear position only. In certain embodiments the sensor 1 is configured to measure an angular position only. In certain embodiments the sensor 1 is configured to measure both linear and angular positions. FIG. 1 is a schematic side sectional view of an example arrangement.

The position of the object 2 is measured relative to a reference point and/or angle of rotation. The sensor 1 comprises a reference component 6 and a displacement component 8. The displacement component 8 is mounted so as to be moveable linearly and/or rotatably relative to the reference component 6. The displacement component 8 may comprise a cylinder 23 and the reference component 6 may comprise a piston 25, for example. The position of the object 2 may in general be measured relative to a point or angle of rotation that is fixed relative to either the reference component 6 or the displacement component 8. In the example of FIG. 1 the object is fixed relative to the displacement component 8.

An input port 10 is provided for receiving a pressurized fluid. The pressurized fluid may be a liquid or a gas or a mixture of the two. In high temperature environments it may be desirable to use a gas to avoid problems or instabilities that might occur due to evaporation of a liquid. One or more of argon, nitrogen, or helium may be used for example. Use of such gases may reduce the rate of degradation (such as oxidation) of components, which might otherwise occur quite quickly at very high temperatures. A system of channels (referred to as a "channelling system") channels the fluid through the sensor 1, including in this embodiment through an interface 16 between the reference and displacement components 6 and 8.

The reference and displacement components 6 and 8 are configured such that a flow resistance of the pressurized fluid through a predetermined flow path varies in a predetermined way as a function of the relative linear and/or angular positions of the reference and displacement components 6 and 8. Examples of different ways of achieving this variation are discussed below. For example, the predetermined flow path may comprise a path passing through an interface 16 between the reference component 6 and the displacement component 8. The reference and displacement components are configured to allow detection of at least three different flow resistances associated respectively with at least three different linear and/or angular positions of the object 2. Thus, the sensor 2 is not limited to detecting a single change in flow resistance, for example from a high flow resistance state to a lower flow resistance state or vice versa, but is capable of monitoring the flow resistance in such a way as to output a range of different values for the relative position of the object 2.

In the example shown in FIG. 1, the object 2 to be measured is brought into contact with the displacement component 8 such that there is a fixed spatial relationship with the displacement component 8 during the measurement process. The reference component 6 is supported by a reference object 4 such that there is a fixed spatial relationship between the reference component 6 and the reference object 4 during the measurement process. Any linear or angular displacement of the object 2 relative to a reference point or angle that is fixed relative to the reference object 4 will therefore cause a corresponding linear and/or angular relative displacement of the reference and displacement components 6 and 8.

A detector 13 is provided that obtains a measure of the flow resistance, or of a change in the flow resistance, through the interface 16. This measure is indicative of the linear and/or angular relative displacement of the reference and displacement components 6 and 8 and therefore also of the relative linear and/or angular position of the object 2. In the example shown in FIG. 1 only the linear position will be measured but further embodiments will be described below in which the relative angular position may be measured in addition or in the alternative.

In an embodiment, the flow resistance depends predominantly on the flow resistance encountered by the pressurized fluid passing through a region 16 of closest approach between an outer surface of the piston 25 and an inner surface of the cylinder 23. The embodiment of FIG. 1 is an example of this type. Here, the fluid flow is shown by arrows 17. The fluid enters the sensor via input port 10 and is driven through a lumen 12 in the piston 25. The fluid leaves the piston 25 at a distal end and enters a volume 14. The fluid is then driven through the region 16 of closest approach between the piston 25 and cylinder 23 before entering a toroidal region 18 and exiting the sensor 1 via the output port 20. The gap between the piston and cylinder in the region 16 is very small and the flow resistance encountered by the fluid is significantly larger through this region that through any other portion of the flow path between the input and output ports 10 and 20. The length of the region 16 (indicated by double ended arrow 22) varies as a function of the relative linear positions of the reference and displacement components 6 and 8 (indicated by double ended arrow 24). The detector 13 can measure the flow resistance by monitoring the fluid properties (e.g. pressure) in the line leading to the input port 10, in the line leading to the output port 20, or in both lines. Calibration measurements may be carried out to take account of factors such as temperature which might also have an effect on the pressure of the fluid.

In the example of FIG. 1 both of the input and output ports are connected to the detector 13. However, this is not essential. In other embodiments the output port is not connected to the detector 13. In such embodiments, the output port may simply vent to the environment around the sensor. For example, the detector 13 may operate in an absolute mode (measuring pressure at the input port only) or in a differential mode (measuring a difference in pressure between the input and output ports).

Figure 2:
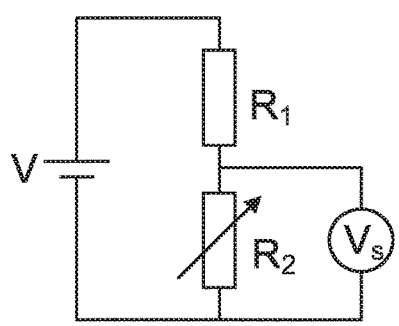
FIG. 2 depicts an electrical circuit to illustrate the analogy between measuring an electrical resistance and measuring a fluidic flow resistance.

One example approach for measuring the flow resistance can be understood by thinking of the analogous electrical circuit. The voltage drop across a resistor is proportional to the resistance of the resistor. This property can be used to measure an unknown resistance in a circuit as shown in FIG. 2. Here, the unknown variable resistance R2 can be obtained from the following expression: $R_2=R_1(Vs/(V-Vs))$. In the case of fluid flows, the pressure drop across a section of the flow path is analogous to the voltage drop across a resistor and is accordingly proportional to the flow resistance of the section of flow path. Therefore the flow resistance can be measured by monitoring the pressure drop across the flow resistance.

Figure 24:
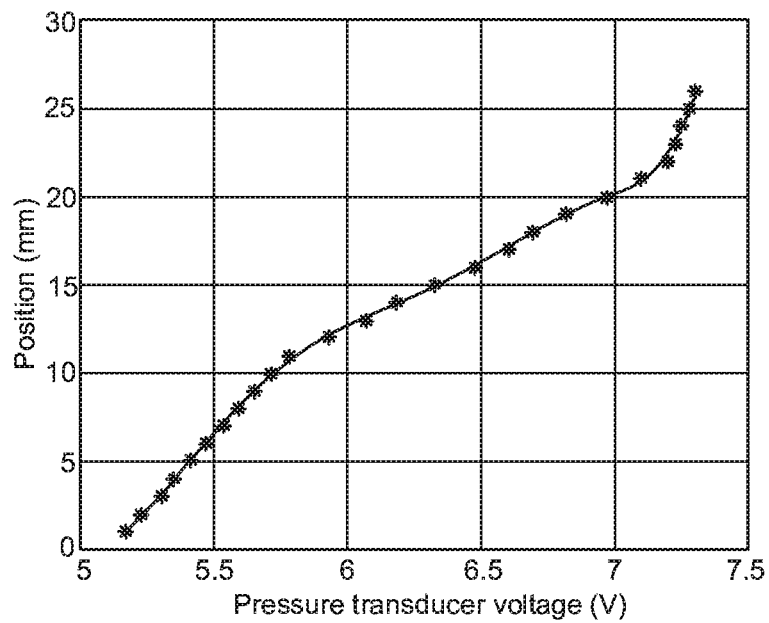
FIG. 24 depicts example calibration measurements of a pressure dependent on a flow resistance for different linear displacements at a temperature of 400° C.
Figure 25:
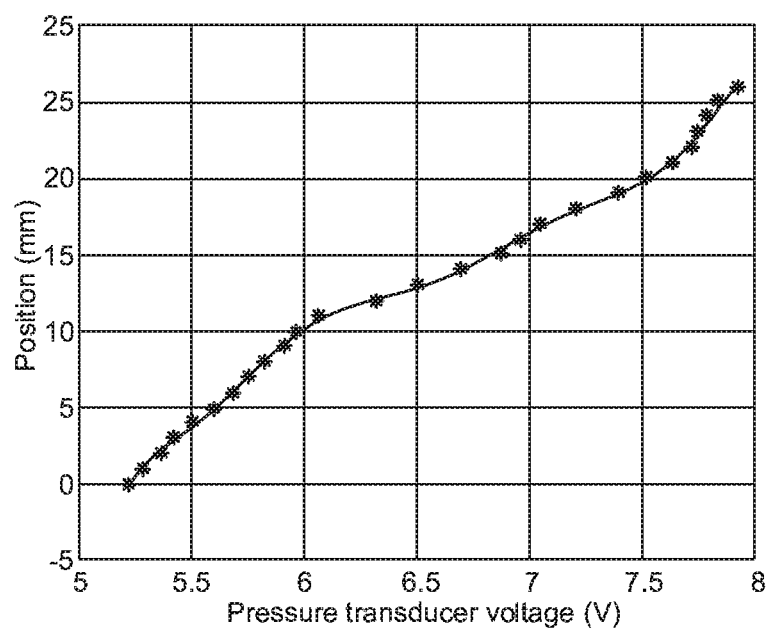
FIG. 25 depicts example calibration measurements of a pressure dependent on a flow resistance for different linear displacements at a temperature of 800° C.

FIGS. 24 and 25 depict example calibration measurements for a sensor 1 of the type shown in FIG. 1. The measurements comprise an output voltage of a pressure transducer for a plurality of different positions of the displacement component 8 relative to the reference component 6. The pressure transducer in this example measures the pressure of the fluid output from the output port 20. The output voltage of the pressure transducer is an example of a measurement of a pressure that is dependent on a flow resistance. FIG. 24 shows calibration measurements taken at 400° C. and FIG. 25 shows calibration measurements taken at 800° C. The best fit curve passes through or very close to all of the data points for both of the temperatures for which example data are given. Tests were carried out comparing independent measurements of the positions of the displacement component 8 relative to the reference component 6 with the positions obtained using the pressure transducer voltage and calibration curves such as those shown in FIGS. 24 and 25. Consistent and accurate agreement was found between the independent position measurements and the position measurements using the sensor 1. The performance is particularly impressive, relative to alternative approaches, at high temperatures. 800° C. is referred to here as an example temperature, but the sensor 1 can be configured to operate at significantly higher temperatures than this.

Figure 21:
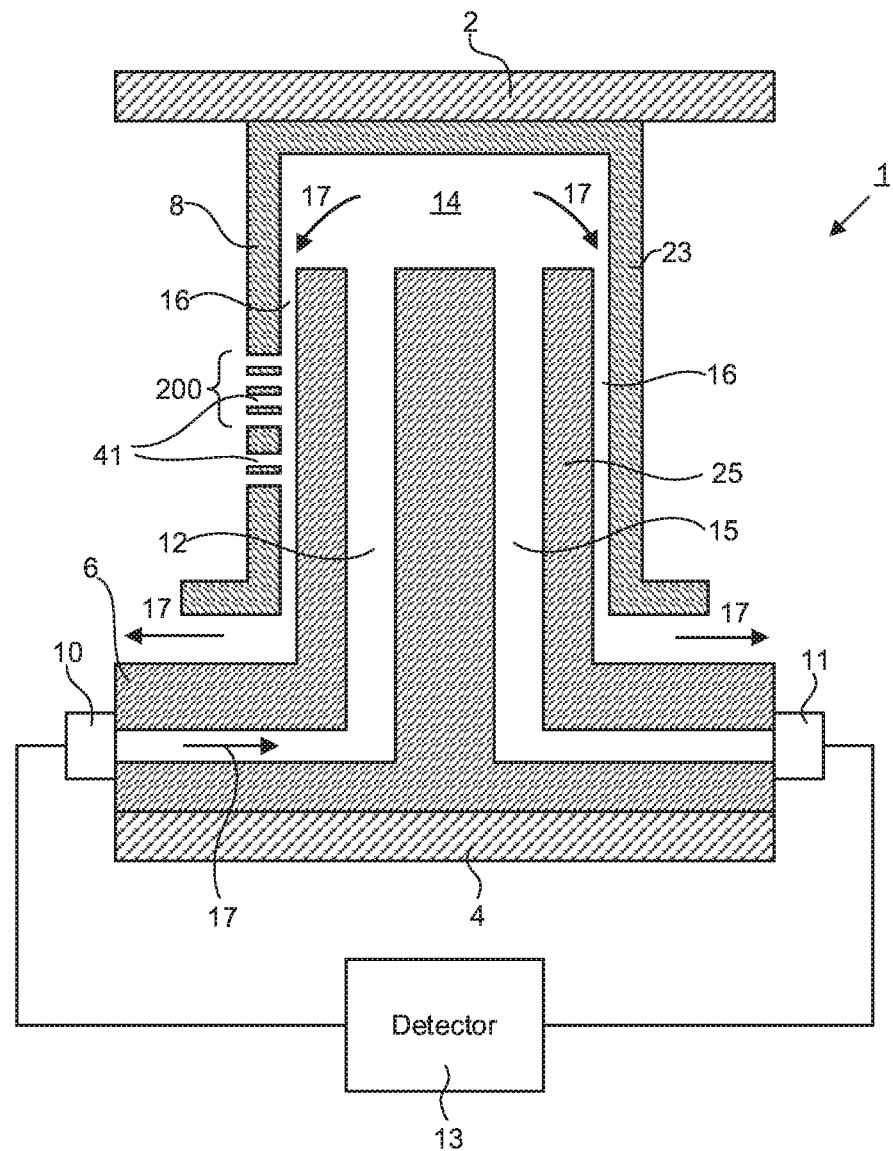
FIG. 21 is a schematic side sectional view of a sensor comprising a cylinder and a piston with two internal lumens.

FIG. 21 shows an alternative to the arrangement of FIG. 1. In this embodiment, a measurement of the pressure in the volume 14 above the distal end of the piston 25 is used to measure the flow resistance instead of measuring the pressure via an output port 20 as in FIG. 1. The piston 25 is provided with a first internal lumen 12 into which the pressurized fluid is channelled so as to flow from a proximal end towards a distal end of the piston 25. The flow leaves the distal end and enters the volume 14 before leaving the volume 14 through the region of closest approach 16 between the outer surface of the piston 25 and the inner surface of the cylinder 23 and/or through one or more cylinder ports 41 traversing the cylinder 23. The detector 13 is configured to measure a pressure in the volume 14, in this example via second lumen 15 in the piston 25 and a corresponding port 11, in order to obtain the measure of the flow resistance or of the change in the flow resistance. The inventors have found that this approach provides a highly accurate measure of the flow resistance.

In an embodiment comprising a piston and cylinder, the outer surface of the piston 25 and/or the inner surface of the cylinder 23 is/are provided with a structure that increases the flow resistance through a gap between the piston and cylinder. The structure may comprise a labyrinth seal structure, for example.

Figure 3:
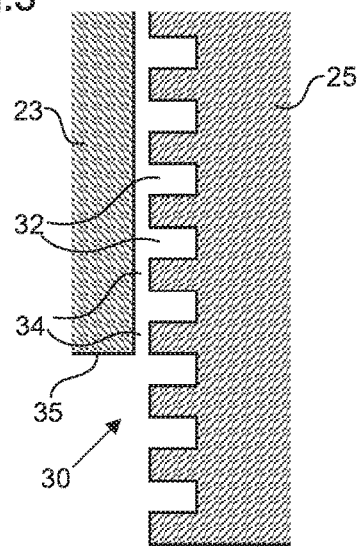
FIG. 3 is a magnified view of a region of closest approach between the piston and cylinder of FIG. 1.

In an embodiment of the type shown in FIG. 1, the outer surface of the piston 25 and/or the inner surface of the cylinder 23 (i.e. the surfaces defining the region 16) is/are provided with a structure that causes the flow resistance in the region 16 to vary non-linearly as the length of the region 16 changes (due to relative movement between the piston 25 and the cylinder 23). FIG. 3 is a schematic side sectional view depicting an example of such a structure 30 formed on the piston 25. In this example, the structure 30 comprises a series of annular grooves 32. In other embodiments, other forms of recesses and/or protrusions may be used. The flow resistance over the grooves 32 is significantly less than the flow resistance over the regions 34 in between the grooves 32. The regions in between the grooves may also be provided with a structure that increases the flow resistance further, such as a labyrinth seal structure. The annular grooves provide a stepped variation in the flow resistance as a function of the relative displacement between the piston 25 and cylinder 23. FIG. 4 illustrates schematically the output from the detector 13, in the case where a measurement of pressure is used to measure the flow resistance. The "displacement" on the horizontal axis represents downwards displacement of the cylinder 23 relative to the piston (which lengthens the region 16). Each plateau 38 corresponds to the leading edge 35 of the cylinder 23 moving past one of the grooves 32 and each step 36 corresponds to the leading edge 35 of the cylinder 23 moving past one of the regions 34 in between the grooves. The provision of a stepped variation in the flow resistance may make it easier to convert between a detected pressure change and a corresponding change in position because it may be easier to identify a number of "steps" associated with the movement. In the alternative case where a smooth, non-stepped variation in the flow resistance is provided, it may be necessary to interpret an absolute change in pressure, which may be more difficult and/or require more sophisticated calibration. A smooth, non-stepped variation in the flow resistance may, however, make it possible to measure position with greater resolution because resolution would not be limited by the size of steps in the variation of flow resistance. Many other forms of variation of flow resistance with position may be achieved by varying the structure in the cylinder or piston. For example, a taper may be provided which causes the gap between the piston and cylinder to change as a function of longitudinal position. The taper could be a smooth taper or a stepped taper. The stepped taper could comprise a single step or a plurality of steps. The taper may change the flow resistance per unit length in a progressive manner. The taper could be used for example where different sensitivities are required. For example, where it is required for the position sensor to be highly sensitive to small displacements over a first range of positions and then less sensitive to small displacements over a second range of positions, the structure in the piston and/or cylinder surfaces could be arranged so that the separation between the surfaces at the point at which the cylinder opens out (e.g. the leading edge 35 of the cylinder 23 in the arrangement of FIG. 3) is smaller for the first range of positions than the second range of positions. Such an arrangement could be achieved using a single step taper for example. Alternatively, it may be desirable to achieved a smoothly changing sensitivity (e.g. smoothly decreasing in this example), in which case a smooth taper could be used.

Arranging for a portion of the variation of flow resistance with displacement to have features (e.g. steps) which recognisably correspond to particular structures (e.g. annular grooves or steps), having a known displacement relative to each other on the piston or cylinder, may also aid calibration of other portions of the variation of flow resistance (which may for example vary more smoothly). For example, step features detected at either end of a smooth variation of flow resistance may provide accurate positional end points for that smooth variation of flow resistance.

In an alternative embodiment, a variation in the flow resistance out of the piston 25 is provided by a plurality of piston ducts 40. A side sectional view of a piston and cylinder from such an embodiment is shown in FIG. 5. A schematic perspective view of the piston 25 is shown in FIG. 6. Each piston duct 40 connects the internal lumen 12 to a different opening 42 in a lateral surface of the piston 25 and movement of the cylinder 23 relative to the piston 25 causes a change in the number of the openings 42 that are covered by an internal surface of the cylinder 23 and/or a change in the extent to which any one or more of the openings is covered by the internal surface of the cylinder 23. In the example shown it can be seen that all of the openings 42 below the leading edge 35 of the cylinder 23 are open and all of the openings 42 above this are blocked by the cylinder. If the cylinder 23 moves upwards the number of openings 42 that become unblocked will increase, lowering the flow resistance and decreasing the pressure drop detected by the detector 13. If the cylinder 23 moves downwards, the opposite occurs and the detected pressure drop will increase. The variation of detected pressure with displacement will have a stepped profile similar to that shown in FIG. 4 (where "displacement" in this case refers to downwards displacement of the cylinder relative to the piston or, equivalently, upwards displacement of the piston relative to the cylinder).

Alternatively or additionally, a variation in the flow resistance out of the piston 25 is provided by a plurality of cylinder ducts 41. An example of such an embodiment is shown in FIG. 21. When a cylinder duct 41 is below the distal end of the piston 25 it will connect the region 16 between the cylinder 23 and piston 25 to a region outside of the cylinder 23. When a cylinder duct 41 is above the distal end of the piston 25 it will provide a direct connection between the volume 14 above the distal end 25 of the piston and the region outside of the cylinder 23. In this latter case, the cylinder duct 41 may make a relatively large contribution to the flow of fluid out of the volume 14. The spatial distribution of cylinder ducts 41 can be configured to provide a desired variation in the sensitivity of the pressure in (or flow rate or flow resistance from) volume 14 to changes in the linear position of the reference component relative to the displacement component. In the example of FIG. 21, a region 200 having a relatively high concentration of cylinder ducts 41 is provided. When the region 200 passes the end of the distal end of the piston 25 the flow out of volume 14 will tend to increase relatively rapidly as a function of linear displacement between the piston 25 and cylinder 23. This therefore represents a range of linear displacements where the measurement of linear displacement has a relatively high sensitivity in comparison with other ranges of relative linear displacement.

In embodiments in which relative movement between the reference and displacement components involves movement of a piston within a cylinder, the pressurized fluid may be used to bias the position of piston within the cylinder longitudinally so that the reference and displacement components are respectively pressed against the object 2 to be measured and the reference object 4.

The density and viscosity of the fluid can vary considerably with temperature. This means that simple measurements of the flow resistance may not directly provide a measure of displacement (e.g. linear displacement) unless used in combination with measurements of the temperature and suitable calibration data. Illustrative figures for the variation of density and viscosity for a typical gas are shown in the table below (based on the ideal gas law).

| Temperature (° C.) | Density (kg/m$^3$) | Viscosity (kg/m · s) |
|---|---|---|
| 20 | 2.40 | $1.83 \times 10^{-5}$ |
| 100 | 1.88 | $2.21 \times 10^{-5}$ |
| 200 | 1.48 | $2.62 \times 10^{-5}$ |
| 500 | 0.91 | $3.64 \times 10^{-5}$ |
| 900 | 0.60 | $4.70 \times 10^{-5}$ |

The inventors have recognised that these problems can be addressed if pressure is applied in a pulsatile manner as described below.

Figure 22:
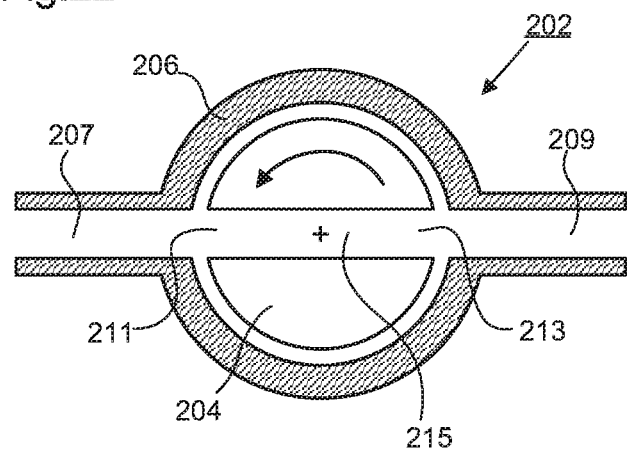
FIG. 22 is a schematic axial view of an example pressure modulator for a fluid source.
Figure 23:
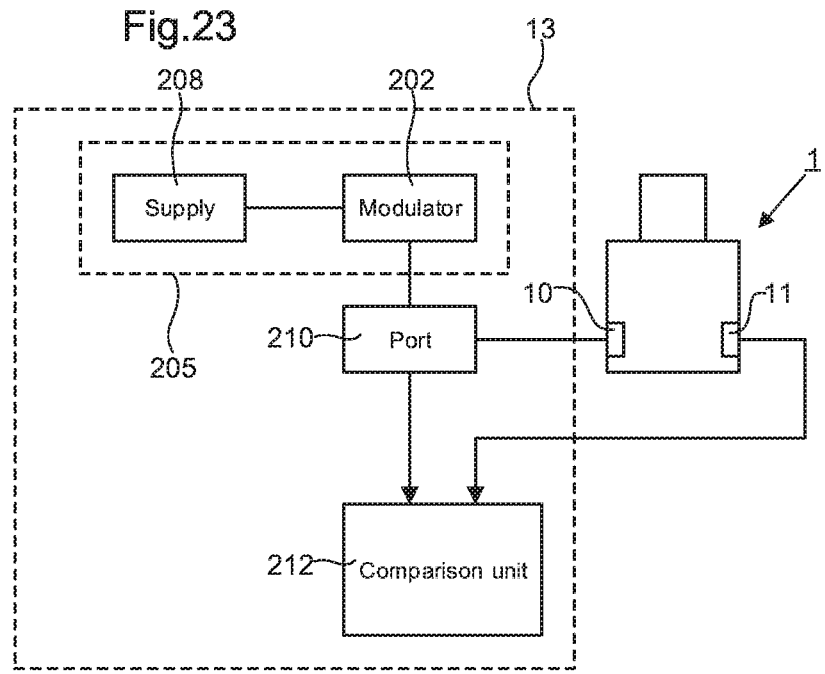
FIG. 23 depicts an example circuit configuration for operating a sensor.

In an embodiment, a fluid source 205 for supplying the pressurized fluid to the input port 10 is provided. An example configuration is shown in FIGS. 22 and 23. The fluid source 205 is configured to provide the pressurized fluid with a pulsatile pressure variation at the input port 10. The pulsatile pressure variation may be periodic, for example sinusoidal, square-wave, or a combination of the two. FIG. 22 depicts an example pressure modulator 202 which is used to generate the pulsatile pressure variation in an embodiment. The pressure modulator 202 comprises a housing 206 (which may also be referred to as a stator body) and a rotatable member 204 (which may also be referred to as a rotor). Rotation of the rotatable member 204 at a constant angular velocity (optionally using a motor and gearbox) will cause openings 211 and 213 of a through-hole 215 in the rotatable member 204 to periodically align with input and output conduits 207 and 209, thereby periodically blocking and unblocking a connection between the input and output conduits 207 and 209. By positioning the pressure modulator 202 between a constant pressure fluid supply system 208 and the input port 10 of the sensor 1 it is possible to create a pulsatile pressure variation at the input port 10, as desired. In variations on this embodiment the rotatable member 204 may be provided with further through-holes and/or the angular spacing between the input and output conduits 207 and 209 may be changed. In the embodiment shown the pulsatile pressure variation will generally be such as to create a large difference in pressure between peaks and troughs. For example, peaks may be expected to be in the region of 90% of the pressure that would be achieved were the pressure modulator 202 not present and troughs may be expected to be in the region of 10% of the pressure that would be achieved were the pressure modulator 202 not present. The pressure variation may be expected to have a smoothed square-wave form having a peak to peak period of 180 degrees of rotation of the rotatable member 204. This may be referred to as a 180 degrees pulser.

In a configuration having two through-holes 215 at 90 degrees to each other, the pressure variation would be expected to have a smoothed square wave form having a peak to peak period of 90 degrees of rotation of the rotatable member 204. This may be referred to as a 90 degrees pulser.

Pressure modulators 202 of the above type (i.e. which use rotation of a rotatable member having one or more through-holes within a housing) are mechanically simple, cheap to produce, and highly reliable.

Furthermore, the fluid source 205, whether implemented using a pressure modulator 202 of the above type or another pressure modulating mechanism, can have one or more of its components positioned distally relative to the sensor 1, for example in an environment which is less harsh than the environment in which the sensor 1 is positioned (e.g. at lower temperature, exposed to lower levels of electrical noise, risk of damage, risk of explosion, etc.). This provided more flexibility in how the fluid source 205 can be designed and operated, thereby reducing cost and/or improving reliability. Conventional, e.g. electrical, equipment can be used to implement some or all of the required functionality. In the case where a pressure modulator 202 of the type discussed above is used, the rotation of the rotatable member 204 can be driven by conventional, e.g. electrical, equipment.

In an embodiment having a pulsatile pressure variation at the input port 10, the detector 13 is configured to measure the linear position of the object relative to the reference based on a differential measurement using the flow resistance or the change in the flow resistance measured at two different pressures in the pressurized fluid at the input port 10, provided by the pulsatile pressure variation. The two different pressures are provided by the pulsatile pressure variation. The differential measurement may be based for example on obtaining a quantity which is proportional to a difference between the flow resistance or change in flow resistance measured at one of the two different input pressures and the flow resistance or change in flow resistance measured at the other one of the two different input pressures. The quantity thus obtained varies repeatably as a function of the relative linear position of the reference and displacement components and therefore provides the basis for obtaining a measure of the relative linear position. The quantity is found to vary less as a function of temperature than the absolute value of the flow resistance or change in flow resistance (e.g. as obtained by measuring the flow resistance when a constant pressure is applied to the input port). The two different pressures may correspond respectively to peaks and troughs of the pulsatile pressure variation. The inventors have found that using such a differential measurement effectively causes the effects of temperature to largely or completely cancel out, thereby allowing a measurement of linear displacement to be obtained without requiring separate measurements of temperature and/or reference to calibration look-up tables. Furthermore, in an embodiment the pulsatile pressure variation is arranged to be such as to cause a continuous reseating of the cylinder 23 against the target object. This improves the sensor's capability to overcome friction and stiction, which may otherwise be significant problems, particularly at elevated temperatures. Relative to alternative embodiments based on rotating elements, the present pulsatile pressure variation approach is considerably simpler and cheaper to produce. It is also easier to achieve high reliability.

FIG. 23 depicts an example circuit configuration for operating a sensor 1 based on the above principles. A detector 13 is provided. The detector 13 comprises a fluid source 205 for supplying pressurized fluid. The fluid source 205 comprises a fluid supply system 208 and a pressure modulator 202. The output from the fluid source 205 is supplied to a redistributing unit 210. The redistributing unit 210 supplies the pulsatile pressure variation to the input port 10 of the sensor 1. The redistributing unit 210 also provides the pulsatile pressure variation to a comparison unit 212. The comparison unit 212 is connected also to the port 11 and is configured to measure a pressure in a volume 14 above the distal end of the piston 25 (see FIG. 21 for example). The comparison unit 212 compares the pressure input at the input port 10 to the pressure in the volume 14 to obtain a measure of the flow resistance out of the volume 14. By performing a differential measurement based on measurements at maximum and minimum values (for example) of the pulsed pressure variation applied at the input port 10, it is possible to obtain a measure of the linear displacement of the piston 25 relative to the cylinder 23 which has a lower dependence on temperature than alternative arrangements which use a continuous, constant applied pressure at the input port 10.

In one particular example, the pressure modulator 202 is implemented using a 90 degrees pulser with input and output conduits 207,209 of 10 mm inner diameter. The rotatable member 204 is coupled to a geared motor for torque and control stability. The rotatable member 204 is rotated at a frequency of 10 to 30 Hz. This range was found to be suitable for providing sufficient fluid flow and pulse transmission for the piping used to make the connections required, which were roughly as follows in this particular example: 1) pressure feed piping length=6 m; 2) bore of pressure feed piping=3 mm inner diameter; 3) length of pressure feed return=6 m; 4) bore of pressure feed return piping=1.5 mm inner diameter.

In an embodiment, the pressurized fluid is also used to cause the piston or cylinder to rotate continuously. The rotation helps to keep the working surface between the piston and cylinder clean and prevents sticking of the cylinder. The rotation helps to keep the cylinder centralized on the piston. The rotation provides gyroscopic stability.

Figure 7:
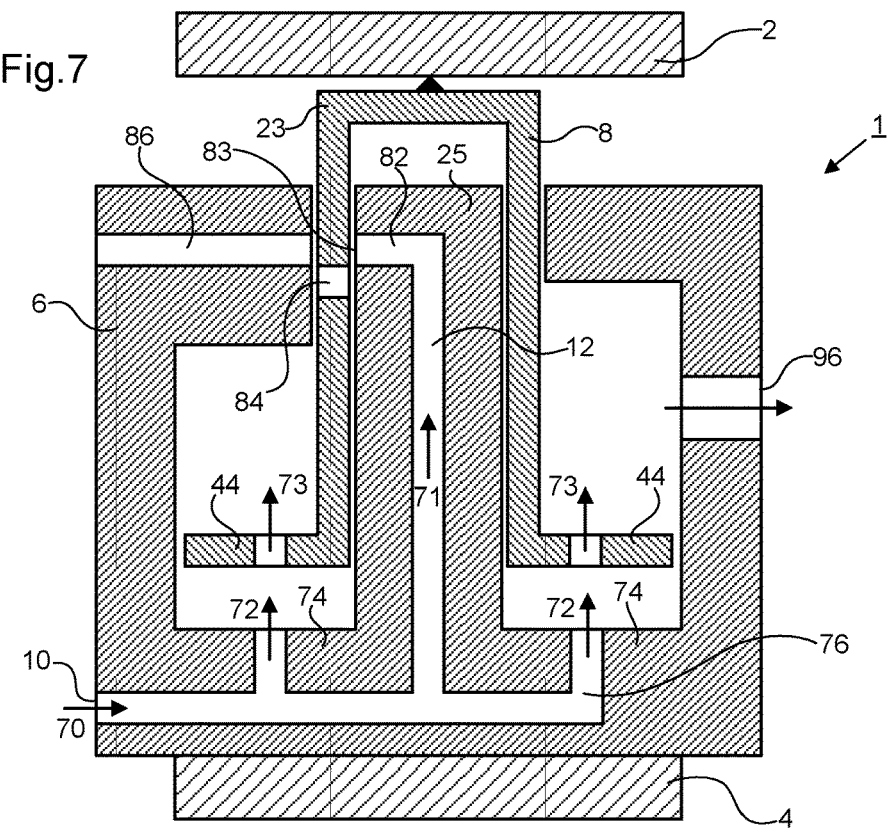
FIG. 7 is a schematic side sectional view of an alternative sensor in which a cylinder is driven to rotate by an applied pressurized fluid and cylinder ducts cause variations in the flow resistance of the pressurized gas.

FIG. 7 is a schematic side sectional view depicting an example of an embodiment in which the cylinder 23 is made to rotate and fluid allowed to escape from the piston 25 through a piston duct 82 and plural ducts 84 in the cylinder 23 during each rotation of the cylinder 23. The time delay and/or magnitudes of the fluid leaks are characteristic of the longitudinal position of the cylinder 23 relative to the piston 25.

Figure 8:
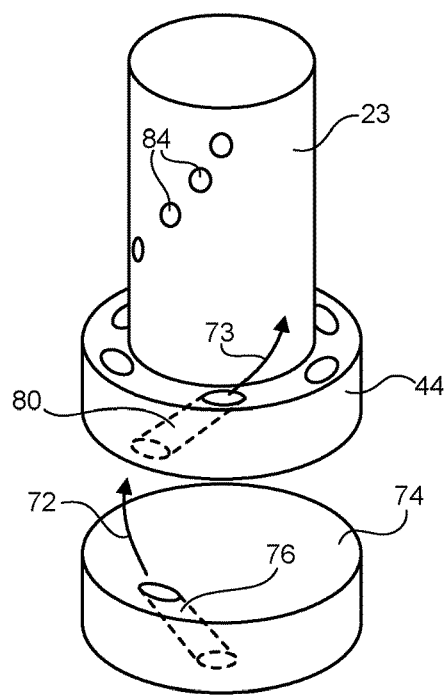
FIG. 8 is a schematic perspective view of a portion of the sensor of FIG. 7.

A channelling system is provided that channels the pressurized fluid through the sensor 1. Fluid enters via an input port 10 (arrow 70) and is directed into a lumen 12 within the piston 25 (arrow 71). The fluid is also directed underneath and through a laterally extending member 44 connected to the cylinder 32 (arrows 72 and 73). This fluid flow is such as to impart rotational motion to the cylinder 23. FIG. 8 is a schematic, simplified perspective view of the cylinder 23 showing an example flow configuration for imparting the rotational motion. A portion of the reference component body below the cylinder 23 is depicted as 74. In this embodiment, a plurality of ducts 76 are provided in the portion 74 that allow fluid to flow into the region beneath the extending member 44. In FIG. 8 only one of these ducts 76 is shown for simplicity. The ducts 76 may be provided at an oblique angle relative to the longitudinal axis of the cylinder 23 (as in the example shown). Fluid therefore exits the duct 76 at a similar angle (arrow 72). Corresponding ducts 80 are provided in the extending member 44. The corresponding ducts 80 may also be angled obliquely, or otherwise arranged, so that the fluid flow changes direction and imparts a torque to the cylinder 23. The torque causes the cylinder 23 to rotate until a steady rotational velocity is achieved. The flow also pushes the cylinder upwards, providing the longitudinal biasing discussed above. A release valve 96 may be provided to limit the range of movement of the cylinder 23. When the extending member 44 passes the level of the release valve 96 the pressurized fluid is diverted through the release valve 96 and cannot force the cylinder 23 further.

In embodiments of this type the piston 25 is provided with a piston duct 82 that connects the internal lumen 12 to an opening 83 in a lateral surface of the piston 25. The cylinder 23 comprises a plurality of cylinder ducts 84 at different longitudinal positions along the cylinder 23. The reference component comprises a reading port 86 that allows fluid to flow out of the lumen 12 through the piston duct 82 and one or more of the cylinder ducts 84 to the detector 13 when the reading port 86 overlaps with the one or more of the cylinder ducts 84. In the arrangement shown in FIG. 7, the reading port 86 is not aligned with the cylinder duct 84 shown but would be aligned if the cylinder 23 moved upwards by a small amount relative to the piston 25. Alternatively, the reading port may be aligned with another cylinder duct 84 that is at a different longitudinal (and angular) position to the cylinder duct 84 shown.

The spatial distribution of the cylinder ducts 84 is such that the detector 13 detects a sequence of pulses that uniquely identifies a longitudinal position of the piston 25 relative to the cylinder 23, thereby detecting a linear displacement and/or position of the object 2. There are many suitable spatial distributions. Non-limited examples of distributions are given below for illustrative purposes.

In an embodiment, the size of the reading duct 86 (i.e. the size of the reading duct opening facing the inside of the cylinder 23) and the longitudinal separation or separations of the cylinder ducts 84 is/are such that for at least a portion of a longitudinal range of motion of the cylinder 23 relative to the piston 25 the reading duct 86 overlaps with at least two different cylinder ducts 84 during at least a portion of one complete rotation of the cylinder 23.

In an example of such an embodiment, the cylinder ducts 84 may be positioned with angular separations that are such that no two longitudinally adjacent ducts 84 have the same angular separation between them. In such an arrangement, whenever pulses are detected from two longitudinally adjacent ducts 84 it is possible uniquely to identify which two ducts 84 they are. The longitudinal separations between longitudinally adjacent ducts 84 may be regular or irregular. An example distribution of ducts 84 is given in the table below:

| Position | P1 | P2 | P3 | P4 | P5 | P6 | P7 | P8 |
|---|---|---|---|---|---|---|---|---|
| Angle (degrees) | 0 | 37.5 | 87.5 | 162.5 | 262.5 | 387.5 | 537.5 | 712.5 |
| Relative angle | | 37.5 | 50 | 75 | 100 | 125 | 150 | 175 |

Figure 9:
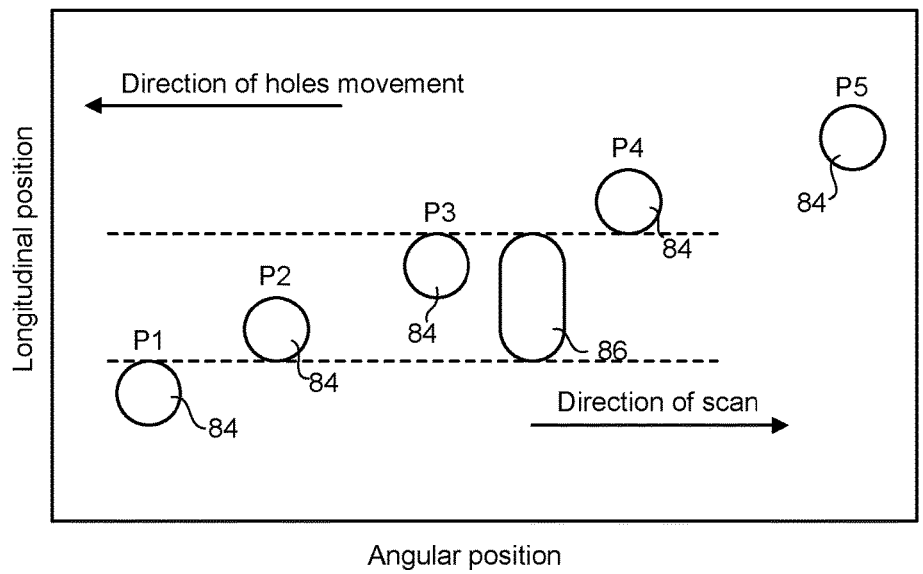
FIG. 9 depicts a first example configuration for the outer surface of a cylinder showing cylinder ducts and the position of a reading port.

Adjacent "positions" (e.g. P1 and P2, P2 and P3, etc,) correspond to ducts 84 that are longitudinally adjacent to each other. With an arrangement of this type it is sufficient to measure the phase angle between any two ducts adjacent to each other (proportional to the time difference between corresponding pulses) to identify which pair they are. This can be achieved by arranging for the reading duct 86 to overlap longitudinally, at least partially, with at least two cylinder ducts 84 at a time. This concept is illustrated in FIG. 9, which shows an example duct pattern notionally "unwrapped" from the cylinder 23 and plotted on an X-Y chart (with the X axis corresponding to angular position and the Y axis corresponding to longitudinal position). In the particular longitudinal position shown, the detector 13 would detect pulses that have a 50 degree phase difference, thereby uniquely identifying the longitudinal position as that which causes overlap with the ducts 84 at positions P2 and P3.

Figure 10:
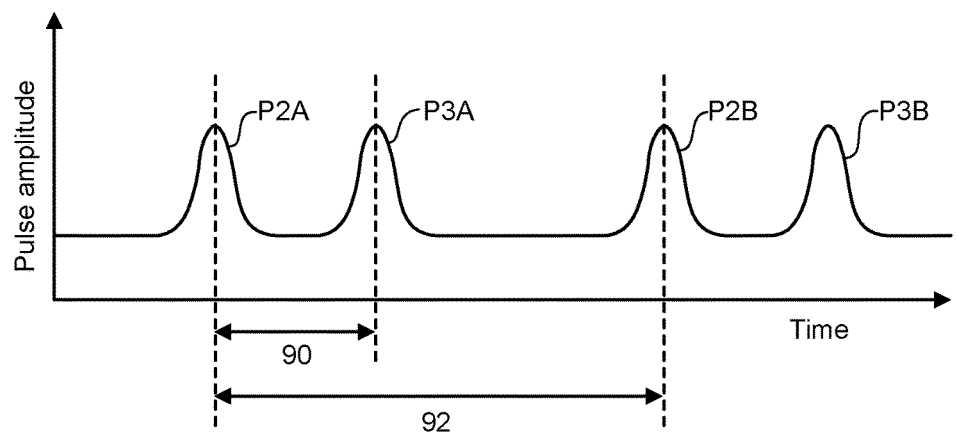
FIG. 10 depicts a schematic graph showing the variation of the output of a detector with time for the configuration of FIG. 9.

FIG. 10 illustrates schematically what the output from the detector 13 (e.g. from a pressure transducer in the detector 13) would be for a cylinder 23 configured and positioned as shown in FIG. 9. The vertical axis is pulse amplitude and the horizontal axis is time. In this example, P2A and P2B are the pulses due to the first arrivals of cylinder ducts P2 and P3 respectively at the reading duct 86. The period between the two pulses is marked by arrow 90. The cylinder continues to rotate until cylinder ducts P2 and P3 again pass the reading duct 86, producing pulses P2B and P3B respectively. The time between the first and a subsequent pulse from a given cylinder duct is marked by arrow 92. The phase angle between the ducts P2 and P3 is (length of 90)/(length of 92)×360 degrees. Reference is then made to the table above to determine which two cylinder ducts have passed the reading duct.

Other spatial configurations will occur as the cylinder 23 moves up and down the piston 25 in response to changes in position of the object 2. The expected output corresponding to these other spatial configurations can be computed to allow the detector 13 to provide an output that is a monotonic function of the relative longitudinal positions of the cylinder 23 and piston 25.

Figure 11:
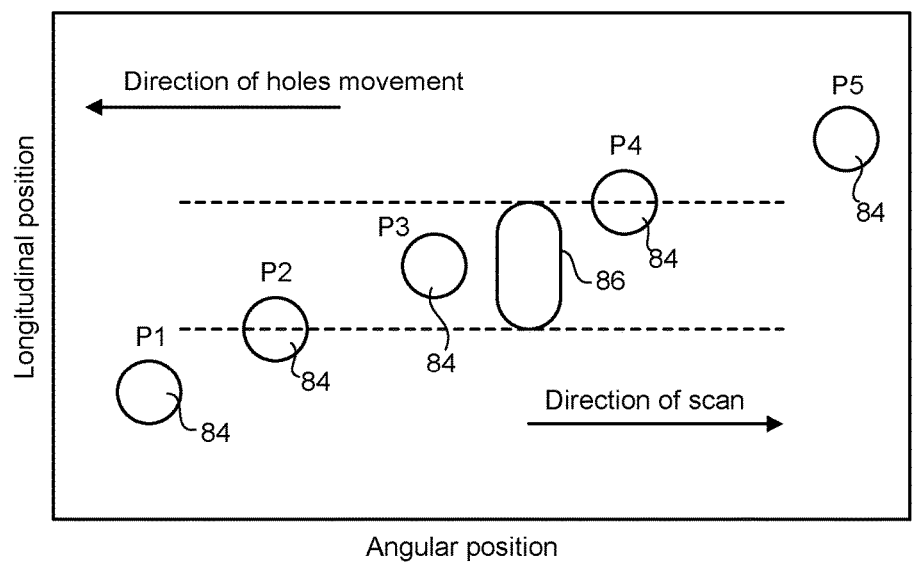
FIG. 11 depicts a second example configuration for the outer surface of the cylinder.
Figure 12:
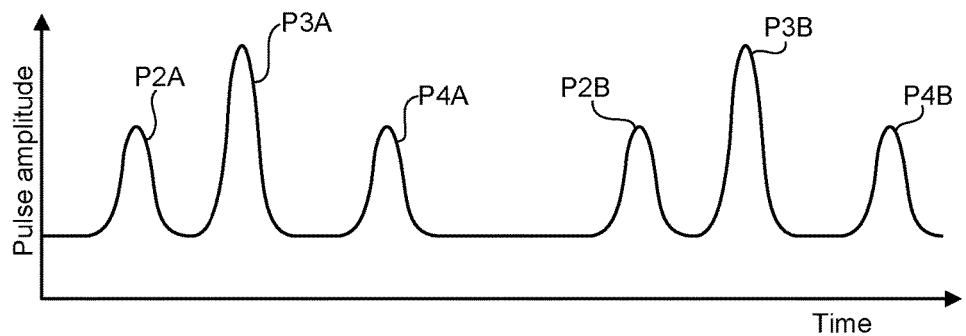
FIG. 12 depicts a schematic graph showing the variation of the output of a detector with time for the configuration of FIG. 11.

A further example spatial configuration is described below with reference to FIGS. 11 and 12. Here, the reading port 86 has moved longitudinally by half a diameter of a cylinder duct 84 relative to the cylinder. This results in the reading port 86 being exposed to three different cylinder ducts 84: P2, P3 and P4. Duct P3 overlaps fully with the reading port 86, while ducts P2 and P4 only partially overlap. The result is that the pulse detected from P2 and P4 will be reduced in magnitude relative to the pulse from P3. The output pulses are illustrated schematically in FIG. 12. The phase and relative pulse amplitudes indicate that the reading port is centred in line with duct P3. Analogous analyses can be carried out, optionally by reference to calibration data, to uniquely identify the relationship between the phases and relative amplitudes of detected pulses for all longitudinal positions of the piston 25 relative to the cylinder 23. Thus, the reading of position is unique, i.e. monotonic. The processing to determine the position of the piston 25 relative to the cylinder 23 can be carried out using a suitably programmed computer, for example.

Figure 13:
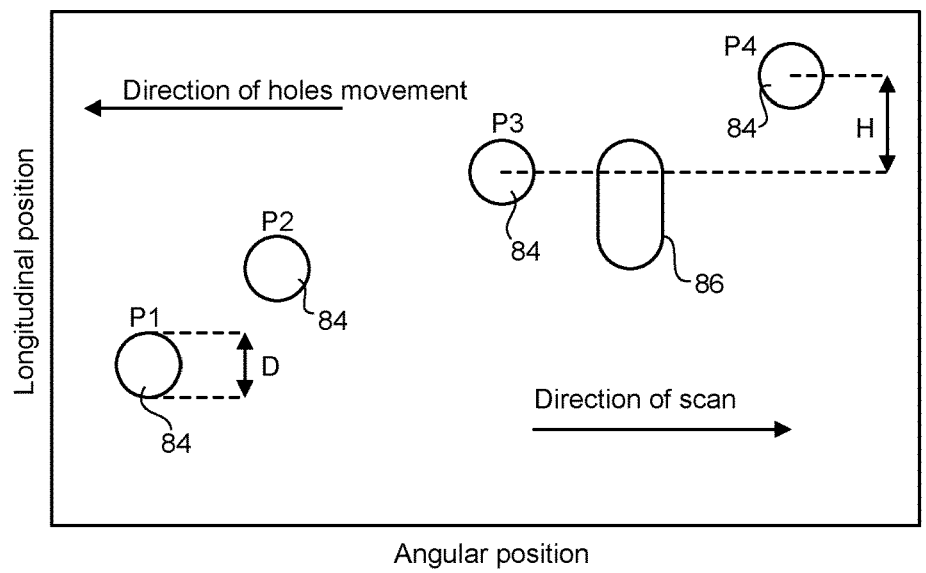
FIG. 13 depicts a third example configuration for the outer surface of the cylinder.

FIG. 13 illustrates an alternative geometry which may allow the processing to determine the position of the piston 25 relative to the cylinder 23 to be carried out more quickly and/or easily. Here, the longitudinal separation of adjacent cylinder ducts 84, H, is increased to 1.5× the diameter of the cylinder ducts, D. In the example of FIGS. 9-12 H was equal to D. The longitudinal length of the reading duct 86 is maintained at 2×D (the same as in the example of FIG. 9-12). In this configuration only two pulses will ever be generated when the cylinder 23 is rotated at any one single longitudinal position. However, the pulses heights will vary between approximately 0.5 and 1 nominal units, still allowing a unique position to be resolved.

In the examples discussed above, none of the cylinder ducts 84 overlap with each other in the longitudinal direction. However, this is not essential; in other embodiments, two or more of the cylinder ducts 84 do overlap. In an embodiment, a plurality of cylinder ducts 84 are provided at the same longitudinal separation. In such an embodiment the angular separation between the ducts 84 may be chosen so that the phase difference between pulses from the ducts 84 at the same longitudinal position uniquely identifies the origin of the pulses in the output signal. In general, the time difference or differences between different ones of the pulses from two or more different cylinder ducts 84 during a single rotation of the cylinder 23 is/are characteristic of the longitudinal position of the piston 25 relative to the cylinder 23.

Figure 14:
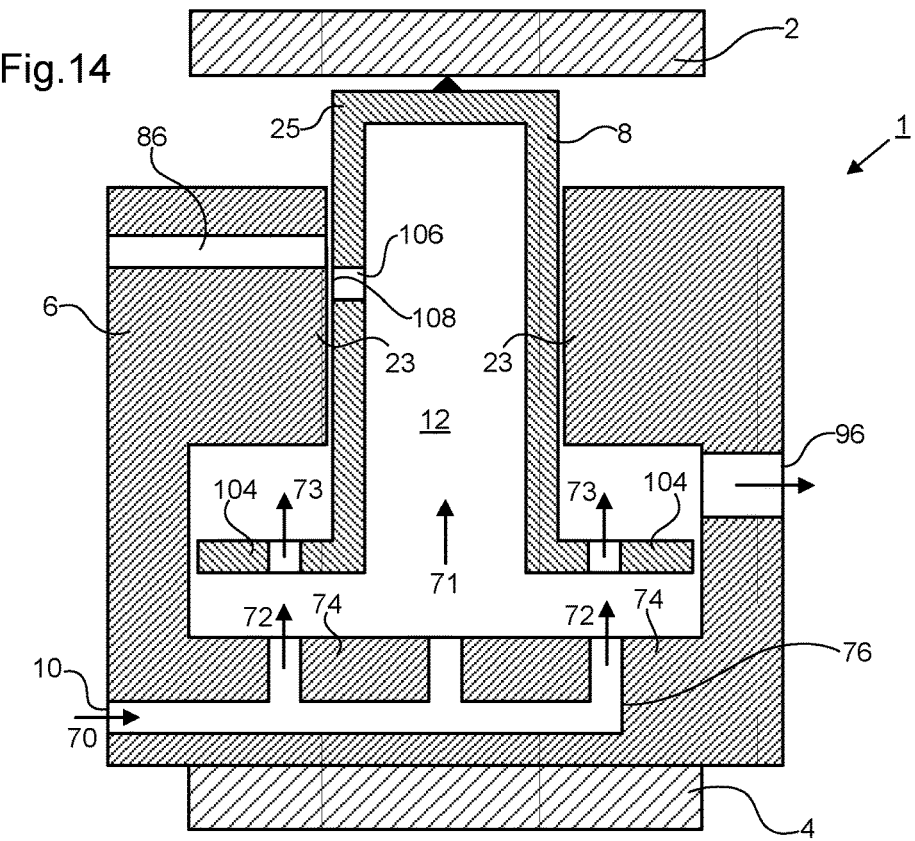
FIG. 14 is a schematic side sectional view of a sensor in which the piston comprises a plurality of piston ducts at different longitudinal positions and the piston is configured to rotate continuously.

In the embodiments discussed above with reference to FIGS. 7-13, the sensor 1 is configured such that the pressurized fluid applies a longitudinal biasing force to the cylinder 23 and causes the cylinder 23 to rotate continuously. FIG. 14 depicts an alternative arrangement in which the pressurized fluid applies a longitudinal biasing force to the piston 25 and causes the piston 25 to rotate continuously. The piston therefore forms part of the displacement component 8. The cylinder 23 remains stationary and forms part of the reference component 6. The principle of operation is similar to that of FIG. 7. Fluid enters via an input port 10 (arrow 70) and is directed into a lumen 12 within the piston 25 (arrow 71). The fluid is also directed underneath and through a laterally extending member 104 connected to the piston 25 (arrows 72 and 73). This fluid flow is such as to impart rotational motion to the piston 25 in the same way as rotational motion can be imparted to the cylinder 23 in the embodiment of FIG. 7, as described above with reference to FIG. 8. The flow applies a torque that causes the piston 45 to rotate until a steady rotational velocity is achieved. The flow also pushes the piston 25 upwards, providing the longitudinal biasing discussed above. A release valve 96 may be provided to limit the range of movement of the piston 25. When the extending member 44 passes the level of the release valve 96 the pressurized fluid is diverted through the release valve 96 and cannot force the piston 25 further.

In embodiments of this type the piston 25 comprises a plurality of piston ducts 106 at different longitudinal positions along the piston 25, each piston duct 106 connecting the lumen 12 to an opening 108 in a lateral surface of the piston 25. The cylinder 23 comprises a reading port 86 that allows fluid to flow out of the lumen 12 through one or more of the piston ducts 106 to the detector 13 when the reading port 86 overlaps with the one or more of the piston ducts 106. In the arrangement shown in FIG. 14, the reading port 86 is not aligned with the piston duct 106 shown but would be aligned if the piston 25 moved upwards by a small amount relative to the cylinder 23. Alternatively, the reading port 86 may be aligned with another piston 106 that is at a different longitudinal (and angular) position to the piston duct 106 shown.

The angular distribution of the piston ducts 106 is such that the detector 13 detects a sequence of pulses that uniquely identifies a longitudinal position of the piston 25 relative to the cylinder 23, thereby detecting a linear displacement and/or position of the object 2. There are many suitable angular distributions as discussed above in the context of FIGS. 7-13. The non-limited examples of distributions of cylinder ducts 84 can be applied to the distribution of piston ducts 106 of embodiments of the type illustrated in FIG. 14.

In embodiments where fluid is forced out of a plurality of openings in lateral sides of a moveable member (e.g. a piston or a cylinder configured to move relative to the reference component 6) it is preferable to distribute the openings angularly so that forces acting on the moveable member due to fluid leaving the openings is more balanced than would be the case if the openings were all provided at the same angular position.

Embodiments have been discussed above in which the pressurized fluid is used to cause continuous rotation of a piston relative to a cylinder or a cylinder relative to a piston. However, it is not essential that both a cylinder and piston be involved. In other embodiments, the channelling system is merely adapted to cause the reference component to rotate continuously relative to the displacement component and to apply a longitudinal biasing force to the reference component (regardless of the relative shapes of these components) or to cause the displacement component to rotate continuously relative to the reference component and to apply a longitudinal biasing force to the displacement component (regardless of the relative shapes of these components).

In the embodiments discussed above that involve rotation of a piston or cylinder, the flow resistance detected by the detector 13 was a flow resistance associated with a predetermined flow path through an interface between the piston and cylinder (e.g. through one or more holes in the wall of the piston or cylinder or through a space between an outer surface of the piston and the inner surface of the cylinder). However, this is not essential. In other embodiments, the predetermined flow path may remain entirely to one side of the rotating component (e.g. entirely on the radial outside of the rotating component or entirely on the radial inside of the rotating component). An example of such an embodiment is described below with reference to FIGS. 15-17.

Figure 15:
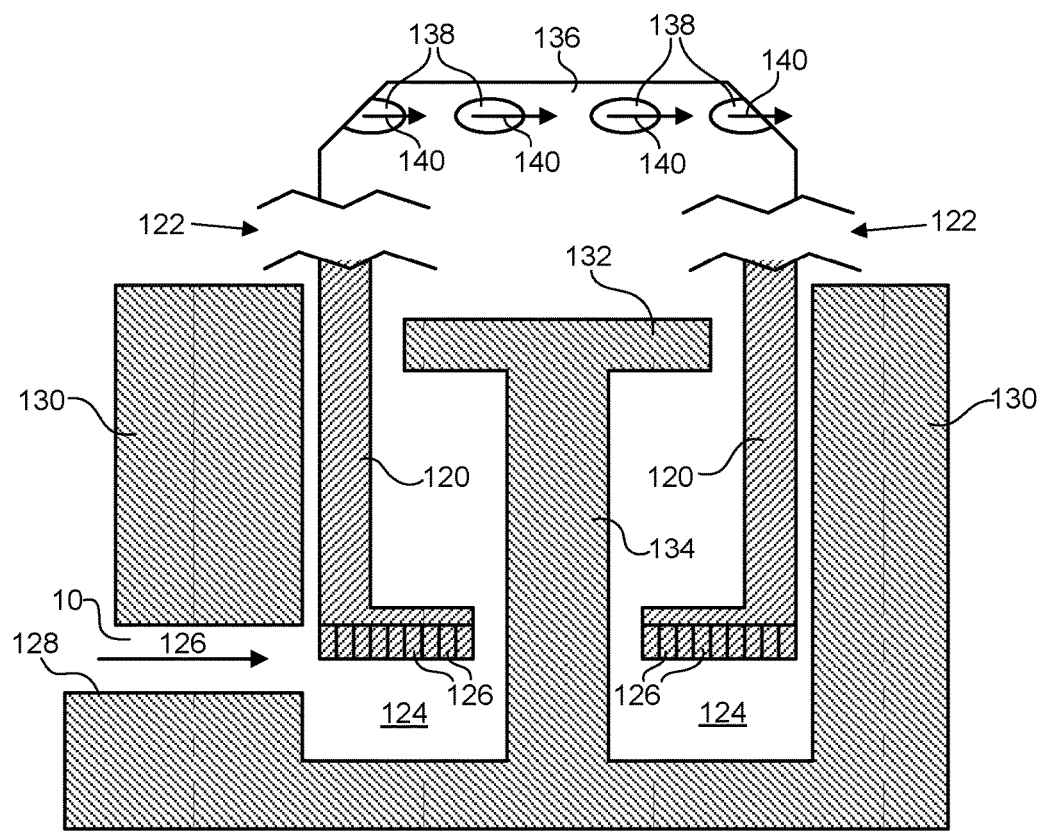
FIG. 15 is a schematic side sectional (bottom) and side (top) view illustrating an example arrangement for using the pressurized fluid to apply rotation and longitudinal biasing to a piston.
Figure 16:
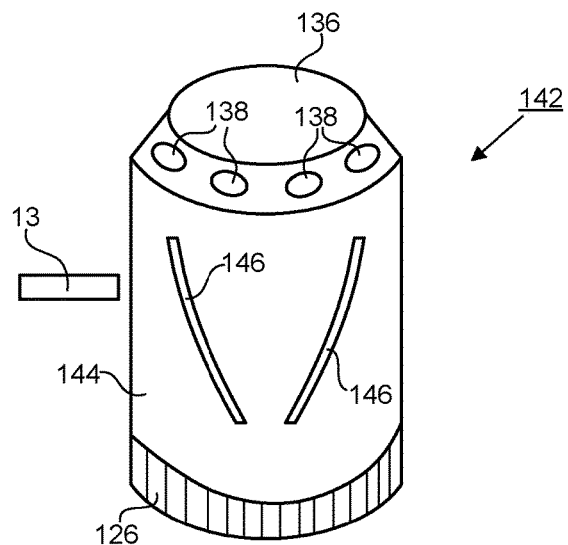
FIG. 16 is a schematic perspective view of the arrangement of FIG. 15 configured to operate as a sensor.

FIG. 15 illustrating an example arrangement for using the pressurized fluid to apply rotation and longitudinal biasing to a piston 120. The figure is separated by diagrammatic break 122 into side sectional and side views (bottom and top respectively). FIG. 16 is a schematic perspective view illustrating how the arrangement of FIG. 15 can be configured to operate as a sensor.

In the arrangement shown, the sensor comprises a piston 120 (which could also be referred to as a cylinder in this particular embodiment). The piston 120 comprises an open end (at the bottom in the orientation of the figure) and a closed end (at the top in the orientation of the figure). Pressurized fluid enters via an input port 10 and flows into a lower chamber 124 (arrows 126). The piston 120 comprises a plurality of vanes 126 that are oriented such that the flow 126 imparts a torque to the piston, causing the piston to rotate about its axis (which is vertical in the orientation of the figure). The entry channel 128 directing the flow 126 towards the piston 120 may direct the flow tangentially relative to piston and plurality of vanes in order to facilitate generation of the torque on the piston 120.

The pressurized fluid continues and enters the open end of the piston 120. The piston 120 is free to move axially within a main body 130, restrained by the "T" configuration 132 of a central shaft 134. The closed end of the piston 136 has tangential exit ports 138 formed through the wall. The tangential exit ports 138 allow the pressurized fluid to escape as tangential jets 140. This imposes another complimentary torque reaction on the piston 120 and assists in maintaining rotation of the piston 120.

The pressurized fluid entering the lower chamber 124 provides an upward, longitudinal biasing force on the piston 120. The tangential flow of the fluid into the lower chamber means that the flow has a vortex like form and provides a tangential force to the vanes 126 even if the vanes 126 are lifted significantly above the entry point for the fluid into the lower chamber 124.

Overall, the fluid generates a rotation of the piston 120 and an upwards bias. The only fluid loss is through the final exit jets 140 and minimal leakage occurs between the main body 130 and the piston 120. In this embodiment the measurement of flow resistance does not depend on flow passing through an interface between a piston and a cylinder, so leakage through any such interface can be minimized.

Referring now to FIG. 16, the arrangement of FIG. 15 can be used as a sensor 142 by providing a detector 13 that is configured to detect a flow resistance through a predetermined flow path that comprises a portion 156 (shown in FIG. 17) that is bordered by a rotating surface 144 of the rotating piston 120. The rotating surface 144 is provided with a structure that causes the flow resistance through the predetermined path to vary, for each rotation of the piston 120, in a manner which is indicative of the longitudinal position of the piston 120 relative to the main body 130.

In the embodiment shown, the structure comprises grooves 146 formed in the rotating surface (the outside wall) 144 of the piston 120. The grooves 146 do not penetrate the piston wall. The grooves 146 extend up and down and partially around the piston 120. The grooves 146 are closer together at the bottom than at the top. The detector 13 detects the presence or absence of the grooves in the region directly in front of the detector 13.

Figure 17:
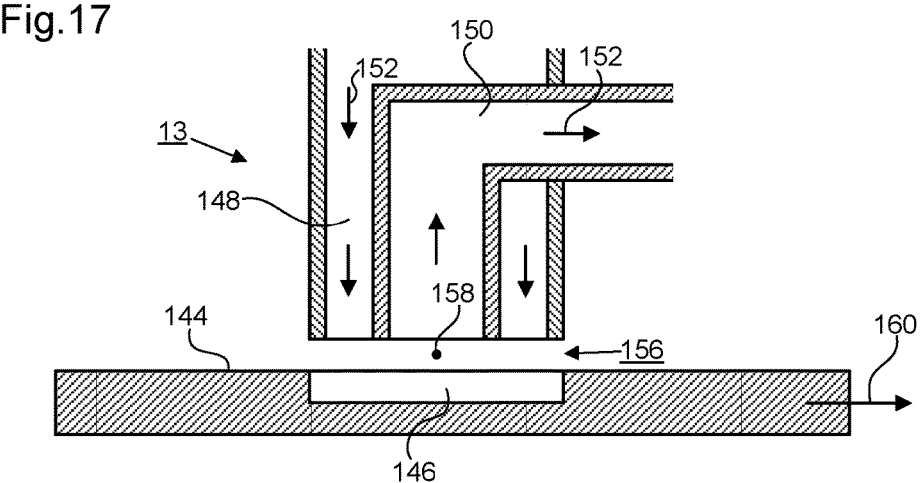
FIG. 17 is a top sectional view of a detector for use in the arrangement of FIG. 16.

FIG. 17 is a top sectional view of the detector 13. The detector 13 comprises an input conduit 148 and a detection conduit 150. A pressurized flow of gas is driven in the sense shown by arrows 152 through the input conduit 148. A flow resistance through a predetermined path is detected by the detector 13. The predetermined path comprises a portion 156 that is bordered by the rotating surface 144. The rotating surface moves from left to right in the orientation of the figure (see arrow 160). When the gap between the rotating surface 144 and the detector 13 is large due to the presence of a structural feature such as a groove 146, the flow resistance through the portion 156 is significantly lower than when the gap is smaller (e.g. when a blank portion of the rotating surface 144 is opposite to the detector 13). In the particular example shown in the figure, the fluid can escape for example upwards or downwards along the groove and/or into the detection conduit 150. This results for example in a relatively low pressure at point 158 when the groove 146 is present and a relatively high pressure at point 158 when the groove 146 is absent (as the fluid cannot easily escape). The detector 13 is therefore able to detect when a structural feature such as a groove 146 passes the detector 13 by detecting the pressure in the region around point 158 using the detection conduit.

Figure 18:
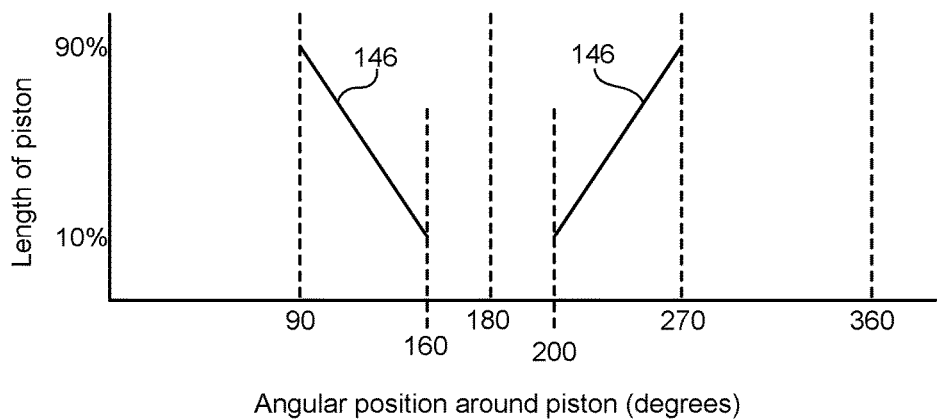
FIG. 18 depicts a schematic graph showing the location of grooves in the outer surface of the piston of FIG. 16.

FIG. 18 is graph showing an example arrangement for grooves 146 of the type illustrated in FIG. 16. In this figure the piston 120 has been "unwrapped" so that a length along the piston 120 (longitudinal position) is depicted on the vertical axis and the angular position around the piston is depicted along the horizontal axis. As can be seen, in this particular example, the grooves 146 are symmetrical about 180 degrees, separated at the bottom by 40 degrees and at the top by 180 degrees.

As the piston 120 rotates the detector 13 scans the passing grooves. As the piston 120 moves axially, the separation between the grooves changes between 40 degrees and 180 degrees for 10% to 90% axial movement.

The embodiment of FIGS. 15-18 is advantageous relative to arrangements that rely on holes through lateral walls of pistons or cylinders because fluid losses are substantially lower and the measurement behaviour is substantially continuous (as opposed to discrete, for example in steps). Different responses in position measurement can readily be achieved (e.g. nonlinear, stepped, etc.) by altering the groove path machined into the cylinder.

In embodiments of the type discussed with reference to FIG. 15-18 it is possible to use the same pressurized fluid source both to drive the rotation and biasing of the piston and to provide the pressurized fluid to the detector 13. It is also possible to use one pressurized fluid source to drive the rotation and biasing of the piston and a different pressurized fluid source to provide the pressurized fluid to the detector 13.

Figure 19:
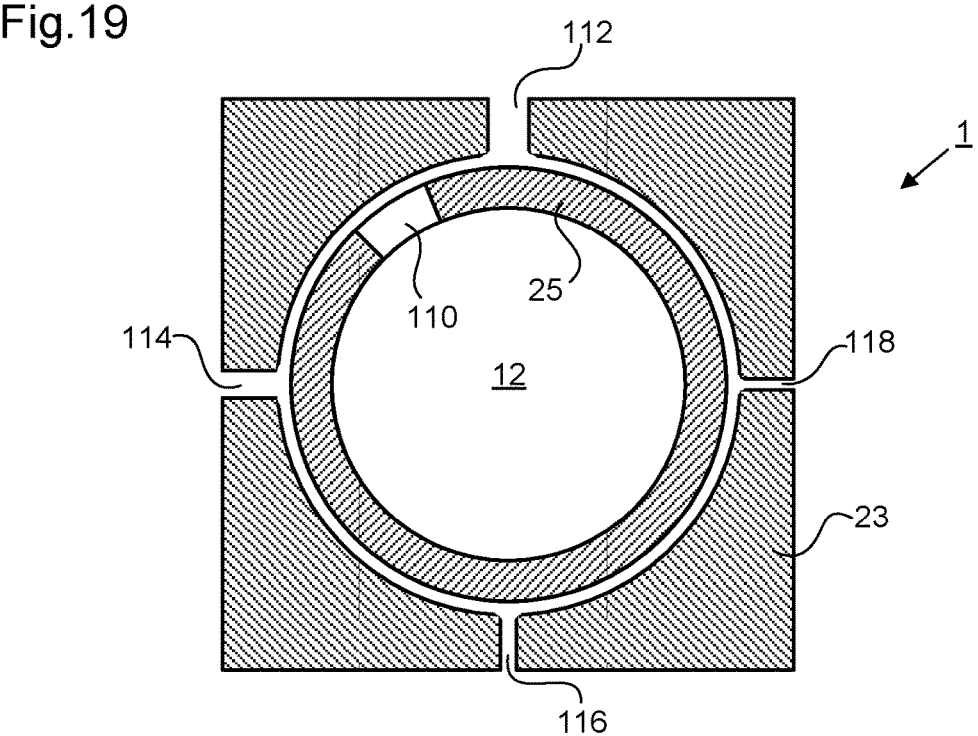
FIG. 19 is a schematic top sectional view of a sensor configured to measure angular displacement.

The embodiments discussed above are described in the context of detecting linear displacement of the object 2. FIG. 19 is a schematic top sectional view showing an example arrangement for detecting an angular displacement of the object 2. In this embodiment, the pressurized fluid is again driven into a lumen 12 within a piston 25. The piston 25 is rotatably mounted in a cylinder 23 in such a way that a rotation of the object whose angular position/displacement is to be measured will cause a corresponding relative rotation between the piston 25 and cylinder 23. The piston comprises a piston duct 110 that traverses a lateral wall of the piston 25. When the angular position of the piston 25 is such that the piston duct 110 is not aligned with any of a plurality of cylinder ducts 112, 114, 116 and 118, the flow resistance to flow out of the lumen 12 is relatively high. On the other hand, when the angular position of the piston 25 is such that the piston duct 110 is aligned with one of a plurality of cylinder ducts 112, 114, 116 and 118, the flow resistance to flow out of the lumen 12 is significantly lower and this reduction in the flow resistance can be measured by a detector connected to an input port providing the pressurized fluid to the lumen 12, as discussed above. In an embodiment, the cylinder ducts 112, 114, 116 and 118 each have a different flow resistance (e.g. a different cross-sectional area or shape or a different length). In this case the extent to which the flow resistance is lowered depends on which of the cylinder ducts 112, 114, 116 and 118 the piston duct 110 is aligned with. A measurement of the flow resistance therefore provides a measure of the angular position of the piston 25 relative to the cylinder 23 and therefore a measure of the angular position of the object under investigation.

Figure 20:
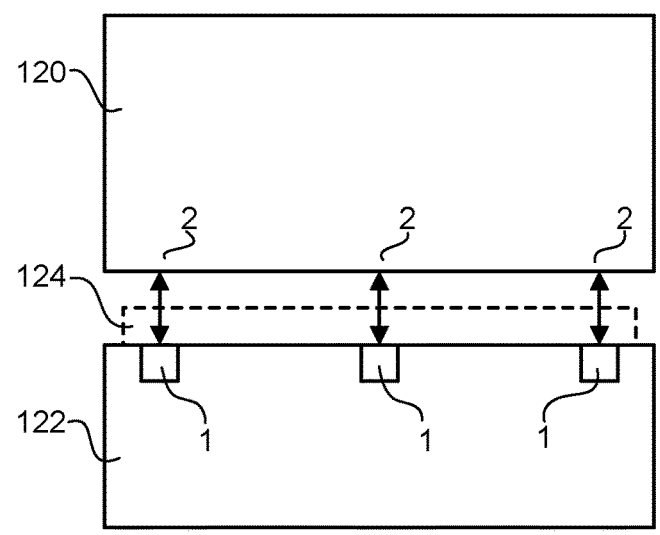
FIG. 20 depicts a pair of mould tool parts comprising sensors according to an embodiment.

In an embodiment, a sensor according to any of the arrangements discussed above is used in a pair of mould tool parts for constraining an article during a moulding process. A schematic side sectional view of such an embodiment is shown in FIG. 20. Here, an upper mould tool part 120 and a lower mould tool part 122 are configured to constrain an article 124 being manufactured. Sensors 1 are build into different parts of the lower mould tool part and are each arranged to measure the position of a localized region 2 on the surface of the upper mould tool part 120 immediately opposite to the sensor 1. Accurate measurement of the distance between the two mould tools parts 120 and 122 at a plurality of locations can be used to gauge the accuracy of the positioning and/or orientation of the two mould tool parts relative to each other. Adjustments can be made to the positioning and/or orientation of the two mould tool parts in response to outputs from the sensors 1, thereby improving the quality of the positioning and/or alignment and the quality of the resulting moulded article. Where defective articles are rejected, this arrangement may improve yield by reducing the frequency of rejections. The moulding process may involve moulding of a metallic article at temperatures in excess of 900 degrees Celsius. The moulding process may involve inflation of an article between the mould tool parts after the mould tool parts have been placed at a predetermined separation relative to each other. The mould tool parts may be shaped so as to impart a desired form to the article constrained between them.

In an embodiment, a sensor according to any of the arrangements discussed above is used in a positioning apparatus. The arrangement of FIG. 20 is an example of such a positioning apparatus. The positioning apparatus comprises one or more actuators for moving an object relative to a reference. In the example shown in FIG. 20, each of the two mould tool parts 120 and 122 are provided with actuators 132 and 134 which are configured to adjust the relative positions and/or orientations of the mould tool parts 120 and 122. This adjustment changes the relative positions of the localized regions 2 and the sensors 1 opposite to them, resulting in a change in the output of the sensors 1. A controller 130 is provided for controlling the actuators 132 and 134 in response to outputs from the sensors 1. Thus, the controller 130 can control the relative positions and/or orientations of the mould tool parts 120 and 122 accurately. FIG. 20 depicts a positioning apparatus in the specific context of an apparatus for moulding an article, but this is not essential. In other embodiments, the positioning apparatus is applied in different technical contexts.

In an embodiment, an actuator is provided that incorporates one or more of the above sensors in which a force is generated to bias the reference component relative to the displacement component. In the actuator, the force providing the bias is configured also to provide the actuation. In this way a single device is capable of providing actuation and of measuring the result, in terms of positional or angular displacement, of the actuation.

The invention claimed is:

1. A sensor for measuring the position of an object relative to a reference, comprising:
   a reference component and a displacement component, the displacement component being moveable linearly, rotatably, or both, relative to the reference component; and
   an input port for receiving a pressurized fluid, wherein:
   the reference and displacement components are configured such that a fluidic flow resistance through a predetermined flow path varies in a predetermined way as a function of a linear position, an angular position, or both, of the reference component relative to the displacement component;
   the reference and displacement components are configured such that the object can engage with the sensor in such a way that a linear displacement, an angular displacement, or both, of the object relative to the reference causes a corresponding linear displacement, angular displacement, or both, between the reference and displacement components;
   the sensor further comprises a detector adapted to obtain a measure of the flow resistance or of a change in the flow resistance and thereby measure a linear position, an angular position, or both, of the object relative to the reference; and
   the reference and displacement components are configured to allow detection of at least three different flow resistances associated respectively with at least three different linear positions, at least three different angular positions, or a combination of at least three different linear and angular positions, of the object relative to the reference.

2. The sensor according to claim 1, further comprising a fluid source for supplying the pressurized fluid to the input port, wherein the fluid source is configured to provide the pressurized fluid with a pulsatile pressure variation at the input port.

3. The sensor according to claim 2, wherein
   the displacement component is moveable linearly relative to the reference component;
   the reference and displacement components are configured such that a fluidic flow resistance through a predetermined flow path varies in a predetermined way as a function of a linear position of the reference component relative to the displacement component;
   the reference and displacement components are configured such that the object can engage with the sensor in such a way that a linear displacement of the object relative to the reference causes a corresponding linear displacement between the reference and displacement components;
   the detector is adapted to obtain a measure of the flow resistance or of a change in the flow resistance and thereby measure a linear position of the object relative to the reference; and
   the reference and displacement components are configured to allow detection of at least three different flow resistances associated respectively with at least three different linear positions of the object relative to the reference.

4. The sensor according to claim 3, wherein the detector is configured to measure the linear position based on a differential measurement using the flow resistance or the change in the flow resistance measured at two different pressures in the pressurized fluid at the input port, provided by the pulsatile pressure variation.

5. The sensor according to claim 1, wherein the predetermined flow path comprises a path passing through an interface between the reference component and the displacement component.

6. The sensor according to claim 1, wherein the reference component comprises a cylinder and the displacement component comprises a piston configured to move linearly, to rotate, or both, within the cylinder.

7. The sensor according to claim 6, wherein:
   the flow resistance depends predominantly on the flow resistance encountered by the pressurized fluid passing through a region of closest approach between an outer surface of the piston and an inner surface of the cylinder; and
   the length of the region varies as a function of the position of the reference component relative to the displacement component.

8. The sensor according to claim 7, wherein an outer surface of the piston or an inner surface of the cylinder is provided with a structure that causes the flow resistance of the region of closest approach to vary non-linearly as a function of the position of the reference component relative to the displacement component.

9. The sensor according to claim 8, wherein the nonlinear variation comprises a plurality of steps.

10. The sensor according to claim 7, wherein the piston comprises:
    a first internal lumen into which the pressurized fluid is channelled so as to flow from a proximal end to a distal end of the piston and to leave the piston at the distal end; and
    a second internal lumen, separate from the first internal lumen, wherein:
    the detector is configured to measure a pressure in a volume adjacent to the distal end of the piston, via the second internal lumen, in order to obtain the measure of the flow resistance or of the change in the flow resistance.

11. The sensor according to claim 6, wherein:
    the piston comprises an internal lumen into which the pressurized fluid is channelled and a plurality of piston ducts each connecting the internal lumen to a different opening in a lateral surface of the piston, wherein the extent to which the openings are covered by an internal surface of the cylinder varies as a function of the longitudinal position, the angular position, or both, of the piston relative to the cylinder, such that the flow resistance detected by the detector is a measure of the longitudinal position, the angular position, or both, of the piston relative to the cylinder and therefore of the linear position, the angular position, or both, of the object relative to the reference.

12. The sensor according to claim 6, further comprising a channelling system adapted to channel the pressurized fluid in such a way that the pressurized fluid causes the cylinder to rotate continuously and applies a longitudinal biasing force to the cylinder.

13. The sensor according to claim 12, wherein:
the channelling system is adapted also to channel the pressurized fluid from the input port into a lumen within the piston;
the piston comprises a piston duct connecting the lumen to an opening in a lateral surface of the piston;
the cylinder comprises a plurality of cylinder ducts at different longitudinal positions along the cylinder;
the reference component comprises a reading port that allows fluid to flow out of the lumen through the piston duct and one or more of the cylinder ducts to the detector when the reading port overlaps with the one or more of the cylinder ducts; and
the spatial distribution of the cylinder ducts is such that the detector detects a sequence of pulses that uniquely identifies a longitudinal position of the piston relative to the cylinder, thereby detecting a linear position of the object relative to the reference.

14. The sensor according to claim 13, wherein the size of the reading duct and the longitudinal separation or separations of the cylinder ducts is/are such that for at least a portion of a longitudinal range of motion of the cylinder relative to the piston the reading duct overlaps with at least two different cylinder ducts during at least a portion of one complete rotation of the cylinder.

15. The sensor according to claim 14, wherein the time difference or differences between different ones of the pulses corresponding to the at least two different cylinder ducts is/are characteristic of the longitudinal position of the piston relative to the cylinder.

16. The sensor according to claim 15, wherein the relative magnitudes and time differences of different ones of the pulses corresponding to the at least two different cylinder ducts are characteristic of the longitudinal position of the piston relative to the cylinder.

17. The sensor according to claim 6, further comprising a channelling system adapted to channel the pressurized fluid in such a way that the pressurized fluid can cause the piston to rotate continuously and applies a longitudinal biasing force to the piston.

18. The sensor according to claim 17, wherein:
the channelling system is adapted also to channel the pressurized fluid from the input port into a lumen within the piston;
the piston comprises a plurality of piston ducts at different longitudinal positions along the piston, each piston duct connecting the lumen to an opening in a lateral surface of the piston;
the cylinder comprises a reading port that allows fluid to flow out of the lumen through one or more of the piston ducts to the detector when the reading port overlaps with the one or more of the piston ducts; and
the spatial distribution of the piston ducts is such that the detector detects a sequence of pulses that uniquely identifies a longitudinal position of the piston relative to the cylinder, thereby detecting the linear position of the object relative to the reference.

19. The sensor according to claim 18, wherein the size of the reading duct and the longitudinal separation or separations of the piston ducts is/are such that for at least a portion of a longitudinal range of motion of the cylinder relative to the piston the reading duct overlaps with at least two different piston ducts during at least a portion of one complete rotation of the cylinder.

20. The sensor according to claim 19, wherein the time difference or differences between different ones of the pulses corresponding to the at least two different piston ducts is/are characteristic of the longitudinal position of the piston relative to the cylinder.

21. The sensor according to claim 20, wherein the relative magnitudes and time differences of different ones of the pulses corresponding to the at least two different piston ducts are characteristic of the longitudinal position of the piston relative to the cylinder.

22. The sensor according to claim 1, wherein:
the sensor comprises a channelling system adapted to channel the pressurized fluid in such a way as to cause the reference component to rotate continuously relative to the displacement component and to apply a longitudinal biasing force to the reference component or to cause the displacement component to rotate continuously relative to the reference component and to apply a longitudinal biasing force to the displacement component; and
the predetermined flow path comprises a portion that is bordered by a rotating surface of the rotating reference or displacement component and the rotating surface comprises a structure that causes the flow resistance through the predetermined path to vary, for each rotation of the rotating reference or displacement component, in a manner which is indicative of the longitudinal position of the reference component relative to the displacement component.

23. The manufacturing apparatus, comprising:
a pair of mould tool parts for constraining an article during a moulding process; and
a sensor according to claim 1 configured to measure the separation between facing portions of the pair of mould tool parts.

24. The apparatus according to claim 23, wherein the article is metallic and the moulding process is performed at temperatures above 900 degrees Celsius.

25. The positioning apparatus, comprising:
an object to be positioned;
an actuator configured to adjust the position of the object;
a sensor according to claim 1 configured to measure the position of the object relative to a reference; and
a controller configured to control the actuator in response to an output from the sensor.

26. The actuator, comprising:
a sensor according to claim 1 configured to generate a force to bias the reference component relative to the displacement component, the force being adapted to displace an object as part of an actuation process and to measure the displacement of the object caused by the actuation.

27. A method of measuring the position of an object relative to a reference, comprising:
providing a reference component and a displacement component, the displacement component being moveable linearly, rotatably, or both, relative to the reference component; and
providing an input port for receiving a pressurized fluid, wherein:
the reference and displacement components are configured such that a fluidic flow resistance through a predetermined flow path varies in a predetermined way as a function of a linear position, an angular position, or both, of the reference component relative to the displacement component;

the method further comprises arranging the object so that it engages with the sensor in such a way that a linear displacement, an angular displacement, or both, of the object relative to the reference causes a corresponding linear displacement, angular displacement, or both, between the reference and displacement components;

the method further comprises using a detector to obtain a measure of the flow resistance or of a change in the flow resistance and thereby measure a linear position, an angular position, or both, of the object relative to the reference; and the reference and displacement components are configured to allow detection of at least three different flow resistances associated respectively with at least three different linear positions, at least three different angular positions, or a combination of at least three different linear and angular positions, of the object relative to the reference.

* * * * *